(12) United States Patent
Nakamura et al.

(10) Patent No.: US 7,825,367 B2
(45) Date of Patent: Nov. 2, 2010

(54) ROTARY ENCODER

(75) Inventors: Yutaka Nakamura, Ashigarakami-gun (JP); Satoshi Yanobe, Ashigarakami-gun (JP)

(73) Assignee: Sokkia Co., Ltd., Atsugi-shi, Kanagawa (JP)

( * ) Notice: Subject to any disclaimer, the term of this patent is extended or adjusted under 35 U.S.C. 154(b) by 338 days.

(21) Appl. No.: 12/093,818

(22) PCT Filed: Aug. 25, 2006

(86) PCT No.: PCT/JP2006/316690

§ 371 (c)(1),
(2), (4) Date: May 15, 2008

(87) PCT Pub. No.: WO2007/086160

PCT Pub. Date: Aug. 2, 2007

(65) Prior Publication Data

US 2010/0181468 A1  Jul. 22, 2010

(51) Int. Cl.
  *G01D 5/34* (2006.01)
(52) U.S. Cl. ............... 250/231.13; 250/231.18; 702/163; 33/1 PT
(58) Field of Classification Search ............ 250/231.13, 250/231.14, 231.16–231.18; 33/1 PT; 702/40, 702/163; 356/614, 617
See application file for complete search history.

(56) References Cited

U.S. PATENT DOCUMENTS 6,928,386 B2 * 8/2005 Hasser ............ 702/163

FOREIGN PATENT DOCUMENTS

| JP | 11-118520 A | 4/1999 |
|---|---|---|
| JP | 2002-013949 A | 1/2002 |
| WO | 2006/043403 | 4/2006 |

OTHER PUBLICATIONS

International Search Report of PCT/JP2006/316690 date of mailing Sep. 26, 2006.

* cited by examiner

*Primary Examiner*—Kevin Pyo
(74) *Attorney, Agent, or Firm*—Westerman, Hattori, Daniels & Adrian, LLP

(57) ABSTRACT

[Problems to be Solved] To provide a rotary encoder capable of carrying out self-calibration for a horizontal encoder as well as a vertical encoder without requiring special equipment and simply and inexpensively with a high degree of accuracy while reducing the burden on a worker.

[Means for Solving the Problems] In a rotary encoder including: a rotary disk (1) with an angle code (11); a light source that irradiates the angle code; a CCD linear sensor (3) that reads the angle code; and a processing unit that acquires a reading value $f(\theta)$ based on the angle code read by the CCD linear sensor, every time the rotary disk is rotated by a predetermined angle, where a rotation angle of the rotary disk is provided as $\theta$ and an angle from the rotation angle $\theta$ is provided as $\phi$, based on a change in a difference $g(\theta,\phi)$ between reading values $f(\theta+\phi)$ and $f(\theta)$ within a reading range on the CCD linear sensor, the difference $g(\theta,\phi)$ is determined as a Fourier series, and self-calibration of the reading value $f(\theta)$ of 0 to 360° is carried out based on the result.

6 Claims, 5 Drawing Sheets

(A)

(B)

(A)

(B)

US 7,825,367 B2

ROTARY ENCODER

TECHNICAL FIELD

The present invention relates to a rotary encoder, and more particularly, to an incremental encoder and an absolute encoder used for a surveying apparatus and the like capable of self-calibrating a measured value.

BACKGROUND ART

A surveying apparatus is equipped with a rotary encoder for measuring a horizontal angle and a vertical angle. The rotary encoder is a device that measures a horizontal angle and a vertical angle by a rotary disk that rotates in conjunction with a telescope and a detector that reads a scale provided along the circumferential direction of this rotary disk.

Rotary encoders include incremental encoders and absolute encoders. An incremental encoder is provided with a rotary disk with an equal-interval and equal-width scale (slits). This incremental encoder irradiates light emitted from a light source onto the rotary disk and detects brightness/darkness according to a number of the scale by a photodetector so as to measure a rotation angle of the rotary disk.

An absolute encoder is, for example, as shown in FIG. 1, provided with a rotary disk 1 applied with slits composed of narrow slits that mean 0 and wide slits that mean 1 and forming, for example, angle codes 11 that indicate angles along a periphery thereof. This absolute encoder irradiates light emitted from a light source (LED) 2 emission-controlled by a CPU 6 onto the rotary disk 1 and detects the angle code 11 with a linear sensor 3. An output of the CCD linear sensor 3 is inputted to the CPU 6 via an A/D converter 5. The CPU 6 decodes the angle code 11 and applies an appropriate interpolation process to thereby calculate an absolute angle of the rotary disk 1 and display the absolute angle on the display unit 7 (see the following Patent Document 1.)

However, in the conventional rotary encoder used for a surveying apparatus, since it is difficult to attach the rotary disk 1 to a rotating shaft without eccentricity and to provide the scale and angle codes completely at equal intervals, errors have occurred in measured values. In order to eliminate such errors, self-calibration by a pair of measurements has been carried out in accordance with the ISO and JSIM standards. For this self-calibration, collimators are disposed around the surveying apparatus, the collimators are collimated while rotating the surveying apparatus by an appropriate angle, and a scale or angle code error is measured.

Patent Document 1: Japanese Published Unexamined Patent Application No. 2002-13949

DISCLOSURE OF THE INVENTION

Problems to be Solved by the Invention

However, in the above-described self-calibration by a pair of measurements, not only is collimation required by hand, but also about one hour of time is required, so that there has been a problem of a great burden on a worker. In addition, an inexperienced worker may increase the collimation error, so that there has also been a problem in lack of accuracy of self-calibration. Furthermore, there has also been a problem that equipment that requires several collimators is expensive. Moreover, there has also been a problem that it is difficult to carry out self-calibration for a vertical encoder.

The present invention has been made in view of the aforementioned problems, and an object thereof is to provide a rotary encoder capable of carrying out self-calibration for a horizontal encoder as well as a vertical encoder without requiring special equipment and simply and inexpensively with a high degree of accuracy while reducing the burden on a worker.

Means for Solving the Problems

In order to solve the aforementioned problems, as claim 1 of the invention, in a rotary encoder including: a rotary disk with an angle code; a light source that irradiates the angle code; a detector that reads the angle code; and a processing unit that acquires a reading value $f(\theta)$ based on the angle code read by the detector, every time the rotary disk is rotated by a predetermined angle, where a rotation angle of the rotary disk is provided as $\theta$ and an arbitrary angle from the rotation angle $\theta$ within a reading range on the detector is provided as $\phi$, the process sing unit acquires reading values $f(\theta+\phi)$ and $f(\theta)$ within the reading range on the detector, and self-calibrates the reading value $f(\theta)$ based on a change in a difference $g(\theta,\phi)$ between the reading values $f(\theta+\phi)$ and $f(\theta)$ when the rotary disk is rotated one turn.

As claim 2 of the invention, in the claim 1 the invention, the rotational position of the rotary disk where the reading values $f(\theta+\phi)$ and $f(\theta)$ are acquired is provided as a position where 360° is roughly equally divided and a position where the reading range on the detector is overlapped at an adjacent rotational position thereto, an average $g_m(\phi)$ of the differences $g(\theta,\phi)$ between the reading values $f(\theta+\phi)$ and $f(\theta)$ traversing one turn and deviations $h(\theta,\phi)$ between the differences $g(\theta,\phi)$ and the average $g_m(\phi)$ at respective rotational positions are taken, and by arranging while overlapping the deviations $h(\theta,\phi)$ in parts where the reading ranges are overlapped between adjacent rotation angle positions, self-calibration of the reading value $f(\theta)$ of 0 to 360° is carried out.

As claim 3 of the invention, in the claim 1 of the invention, the rotational position of the rotary disk where the reading values $f(\theta+\phi)$ and $f(\theta)$ are acquired is provided as a position where 360° is roughly equally divided, based on a change in the difference $g(\theta,\phi)$ between the reading values $f(\theta+\phi)$ and $f(\theta)$, the difference $g(\theta,\phi)$ is determined as a Fourier series, and self-calibration of the reading value $f(\theta)$ of 0 to 360° is carried out based on the result.

As claim 4 of the invention, in the claim 3 of the invention, in the Fourier series, one or more arbitrary higher harmonics are determined.

As claim 5 of the invention, in the claims 1, 2, 3, or 4 of the invention, for the arbitrary angle $\theta$, one or more arbitrary positions are used.

As claim 6 of the invention, in the claim 1, 2, 3, 4, or 5 of the invention, the reading values $f(\theta+\phi)$ and $f(\theta)$ are acquired by averaging a large number of times of reading values.

Effects of the Invention

According to the claim 1 of the invention, by the present invention, every time the rotary disk is rotated by a predetermined angle, where a rotation angle of the rotary disk is provided as $\theta$ and an arbitrary angle from the rotation angle $\theta$ within a reading range on the detector is provided as $\phi$, reading values $f(\theta+\phi)$ and $f(\theta)$ within the reading range on the detector can be acquired, and the reading value $f(\theta)$ is self-calibrated based on a change in a difference $g(\theta,\phi)$ between the reading values $f(\theta+\phi)$ and $f(\theta)$ when the rotary disk is rotated one turn, and therefore, self-calibration of a horizontal encoder and a vertical encoder can be carried out without requiring special equipment and simply and inexpensively with a high degree of accuracy while reducing the burden on a worker, and a highly-accurate measured angle value can be acquired.

According to the claim 2 of the invention, by the present invention, furthermore, the rotational position of the rotary disk where the reading values f(θ+φ) and f(θ) are acquired is provided as a position where 360° is roughly equally divided and a position where the reading range on the detector is overlapped at an adjacent rotational position thereto, an average $g_m(φ)$ of the differences g(θ,φ) between the reading values f(θ+φ) and f(θ) traversing one turn and deviations h(θ,φ) between the differences g(θ,φ) and the average $g_m(φ)$ at respective rotational positions are taken, and by arranging while overlapping the deviations h(θ,φ) in parts where the reading ranges are overlapped between adjacent rotation angle positions, self-calibration of the reading value f(θ) of 0 to 360° is carried out, and therefore, self-calibration can be carried out more quickly.

According to claim 3 of the invention, by the present invention, the rotational position of the rotary disk where the reading values f(θ+φ) and f(θ) are acquired is provided as a position where 360° is roughly equally divided, based on a change in the difference g(θ,φ) between the reading values f(θ+φ) and f(θ), the difference g(θ,φ) is determined as a Fourier series, and self-calibration of the reading value f(θ) of 0 to 360° is carried out based on the result, and therefore, not only can further highly-accurate self-calibration be carried out, but also a highly-accurate measured angle value can be acquired.

According to the claim 4 of the invention, furthermore, in the Fourier series, one or more arbitrary higher harmonics are determined, and therefore, calibration accuracy can be improved without increasing the time required for calibration very much.

According to the claim 5 of the invention, furthermore, for the arbitrary angle φ, one or more arbitrary positions are used, and therefore, calibration accuracy can further be improved.

According to the claim 6 of the invention, furthermore, the reading values are acquired by averaging a large number of times of reading values, and therefore, influence of noise and the like can be reduced, and self-calibration can be carried out with a higher degree of accuracy.

BEST MODE FOR CARRYING OUT THE INVENTION

Hereinafter, the present invention will be described in detail based on the drawings. First, description will be given of a first embodiment of the present invention based on FIG. 2 to FIG. 4. FIG. 2 is a plan view showing a positional relationship between a rotary disk and a CCD linear sensor in an absolute encoder (hereinafter, simply referred to as an encoder) of the present embodiment. FIG. 3 are views for explaining a self-calibrating method of this encoder. FIG. 4 is a flowchart showing self-calibration procedures of this encoder. This encoder has the same configuration as that of a conventional encoder shown in FIG. 1 except for having a self-calibration function to be described below. For this reason, description of the configuration of this encoder will be omitted. Therefore, the self-calibration function of this encoder will be described in detail.

In the plan view of FIG. 2, a foot of a vertical line drawn from a center O of a rotary disk 1 to a CCD linear sensor 3 is provided as A. In addition, an appropriate point on the linear sensor 3 is provided as B. A CPU 6 can read respective angle codes 11 applied to the rotary disk 1 directly under the point A and point B by the linear sensor 3 to determine angle reading values f(θ) and f(θ+φ) at the point A and point B, respectively. Here, a true angle of the point A created from a 0°-direction M is provided as θ, and a true angle of an angle AOB is provided as φ.

However, the reading values f(θ) and f(θ+φ) are periodic functions with a period of 360° and can therefore be expressed by the following formulas by use of Fourier series.

$$f(θ)=θ+\Sigma_{n=1}^{M/2} A_n * \sin(nθ+α_n) \quad (1)$$

$$f(θ+φ)=(θ+φ)+\Sigma_{n=1}^{M/2} A_n * \sin\{n(θ+φ)+α_n\} \quad (2)$$

Here, n means a natural number (1, 2, 3, ... M/2) expressing the order of a higher harmonic, An means amplitude of the n-th higher harmonic, an means an initial phase of the n-th higher harmonic, and M means a scale number, which is an even number.

Therefore, by a comparison between the respective reading values f(θ) and f(θ+φ) of the point A and point B, a difference g(θ,φ) therebetween shown by the following formula is determined.

$$g(θ,φ)=f(θ+φ)-f(θ) \quad (3)$$

This difference g(θ,φ) can be expressed as in the following formula based on formulas (1) and (2).

$$g(θ,φ)=f(θ+φ)-f(θ)=(θ+φ)+\Sigma_{n=1}^{M/2} A_n * \sin\{n(θ+φ)+α_n\}-θ+\Sigma_{n=1}^{M/2} A_n * \sin(nθ+α_n) \quad (4)$$

When the calculation is further continued, g(θ,φ) finally becomes as in the following formula.

$$g(θ, φ) = φ + \sum_{n=1}^{M/2} A_n * \sin(nθ/2) * \cos\{n(θ + φ/2) + α_n\}$$
$$= B_0 + \sum_{n=1}^{M/2} B_n * \sin(nθ + β_n) \quad (5)$$

Here, $$φ = B_0 \quad (6)$$

$$A_n = B_n / \sin(nφ/2) \quad (7)$$

$$α_n = β_n - nφ/2 + π/2 \quad (8)$$

In this manner, g(θ,φ) can also be expressed by a Fourier series with a period of 360°.

Therefore, as shown in FIG. 3(A), at a position with a rotation angle $θ_j$ where the rotary disk 1 is rotated by only a predetermined angle (for example, 5°) obtained by dividing 360° into N equal parts, when reading values at the point A and point B are acquired, $g(θ_j,φ)$ for each predetermined angle $θ_j$ shown in formula (3) is determined as shown in FIG. 3(B). Here, j=0, 1, 2, 3 .... N–1. Once $g(θ_j,φ)$ for each predetermined angle $θ_j$ is determined, the respective coefficients $B_0$, $B_n$, and $β_n$ of the Fourier series in formula (5) can be calculated by a known method. Once $B_0$, $B_n$, and $β_n$ are thus determined, further by use of formulas (6), (7), and (8), φ, $A_n$, and $α_n$ can also be determined. Once $A_n$ and $α_n$ are thus found out, the true angle θ can be determined by the following formula, which is a deformation of formula (1).

$$θ=f(θ)-\Sigma_{n=1}^{M/2} A_n * \sin(nθ+α_n)=f(θ)-E(θ) \quad (9)$$

Here, $E(θ)=\Sigma_{n=1}^{M/2} A_n * \sin(nθ+α_n)$ means an error function. Here, in a Fourier series of the error function E(θ), it is unnecessary to determine excessively high-order higher harmonics, and in a rotary encoder of opposing detection, an eccentric error has been cancelled, and thus it is often sufficient to determine the second higher harmonic (n=2). Even when the third and higher harmonics are determined, this only increases the calculation amount and storage capacity and calibration accuracy is not improved very much in most cases.

In order to realize a higher calibration accuracy, it is necessary to eliminate influence of noise and the like. Therefore, at the time of angle measurement, by carrying out data acquisition from the CCD linear sensor 3 a large number of times and taking an average, the reading values f(θ) and f(θ+φ) are determined. As is apparent from the above description, according to the present embodiment, the error function E(θ) of a measured angle value is determined without particularly requiring an experienced engineer or expensive equipment, and a higher calibration accuracy can be realized.

The above self-calibration is carried out by the CPU 6. Procedures of this self-calibration are shown in FIG. 4.

First, when a self-calibration program is started, the process proceeds to step S1 to acquire reading values $f(\theta_j)$ and $f(\theta_j+\phi)$ directly under the two points A and B on the CCD linear sensor 3. After carrying out this reading a predetermined number of times, the process proceeds to step S2 to calculate an average of the reading values $f(\theta_j+\phi)$ and $f(\theta_j)$. Furthermore, the process proceeds to step S3 to calculate and store a difference $g(\theta_j,\phi)=f(\theta_j+\phi)-f(\theta_j)$ between the two reading values $f(\theta_j+\phi)$ and $f(\theta_j)$.

Next, the process proceeds to step S4 to check whether all possible data has been acquired, that is, to check whether $g(\theta_j,\phi)$ for each predetermined angle $\theta_j$ has been acquired. For example, it is checked for θ whether $g(\theta_j,\phi)$ has been acquired at intervals of 5° traversing 360°. If all possible data has not been acquired, the process proceeds to step S5, the rotary disk 1 is manually rotated by a predetermined angle (automation by a stepping motor or the like is also possible), and the process returns to step S1. Thereafter, steps S1 to S5 are repeated to determine and store $g(\theta_j,\phi)$ for each predetermined angle $\theta_j$.

When it is judged in step S4 that the predetermined number of times of data acquisition has been completed, the process proceeds to step S6 to calculate, based on $g(\theta,\phi)$ for each predetermined angle $\theta_j$, coefficients of the Fourier series of $g(\theta,\phi)$ shown in formula (5), that is, $B_0$, $B_n$, and $\beta_n$. Furthermore, the process proceeds to step S7 to calculate, based on these $B_0$, $B_n$, and $\beta_n$, coefficients of a Fourier series of an error function E(θ) of the reading value f(θ), that is, $A_n$ and $\alpha_n$. Furthermore, the process proceeds to step S8 to determine and store these $A_n$ and $\alpha_n$. This allows accurately determining the true angle θ based on the reading value f(θ) by use of formula (9) in the subsequent measurement.

Next, description will be given of a second embodiment of the present invention based on FIG. 2, FIG. 5, and FIG. 6. As shown in FIG. 2, at the position with the rotation angle θ of the rotary disk 1, within a reading range on the linear sensor 3, when the value of θ is varied while θ is fixed, a change in the reading value f(θ+φ) can be determined. Similar to the aforementioned formulas (1) and (2), the reading values f(θ+φ) and f(θ) are expressed by the following formulas.

$$f(\theta)=\theta+\Sigma_{n=1}^{\infty}A_n*\sin(n\theta+\alpha_n)=\theta+E(\theta) \quad (11)$$

$$f(\theta+\phi)=(\theta+\phi)+\Sigma_{n=1}^{\infty}A_n*\sin\{n(\theta+\phi)+\alpha_n\}=(\theta+\phi)+E(\theta+\phi) \quad (12)$$

Here, E(θ) means an error function.

Here, a difference g(θ,φ) between both reading values f(θ+φ) and f(θ) shown by the following formula is calculated.

$$g(\theta,\phi)=f(\theta+\phi)-f(\theta) \quad (13)$$

When formulas (11) and (12) are substituted for formula (13), the following formula is obtained.

$$g(\theta,\phi)=\phi+E(\theta+\phi)-(\theta) \quad (14)$$

Now, as shown in FIG. 5(A), at a position with a rotation angle $\theta_j$ where the rotary disk 1 is rotated by only a predetermined angle (for example, 5°) obtained by dividing 360° into N equal parts, while moving the point B, that is, while varying φ, a reading value $f(\theta_j+\phi)$ at the point B is acquired within a reading range on the CCD linear sensor 3. However, at adjacent rotational positions $\theta_{j-1}$, $\theta_j$, and $\theta_{j+1}$, the reading ranges of $f(\theta_{j-1},\phi')$, $f(\theta_j,\phi)$, and $f(\theta_{j+1},\phi'')$ are overlapped, and j=0, 1, 2, 3 . . . N–1. Thus, $g(\theta_j,\phi)$ shown in formula (13) is determined for each predetermined angle $\theta_j$, and an average $g_m(\phi)$ of this $g(\theta_j,\phi)$ is taken as in the following formula.

$$g_m(\phi)=\{\Sigma_{j=0}^{N-1}g(\theta_j,\phi)\}/N\approx\phi \quad (15)$$

Therefore, $h(\theta_j,\phi)$ defined by the following formula (16) is further calculated.

$$h(\theta_j,\phi)=g(\theta_j,\phi)-g_m(\phi) \quad (16)$$

When formulas (14) and (15) are substituted for formula (16), the following formula is obtained.

$$h(\theta_j,\phi)\approx E(\theta_j+\phi)-E(\theta_j) \quad (17)$$

Here, where $E(\theta_j)$ is provided as $C_j$ when $E(\theta_j)$ is considered as a constant assuming that the position of $\theta_j$ is set to a base point, formula (17) can be expressed as in the following formula.

$$h(\theta_j,\phi)\approx E(\theta_j+\phi)-C_j \quad (18)$$

Although this $C_j$ is an unknown, since the reading ranges are overlapped at the adjacent rotational positions $\theta_{j-1}$ and $\theta_j$, $h(\theta_{j-1},\phi')$ and $h(\theta_j,\phi)$ must be coincident in the overlapping range. An offset adjustment amount $\Delta C_j$ therebetween is expressed by the following formula.

$$\Delta C_j=C_j-C_{j-1} \quad (19)$$

When $h(\theta_j,\phi)$ adjusted by use of this offset adjustment amount $\Delta C_j$ is provided as $h'(\theta_j,\phi)$, $h'(\theta_j,\phi)$ is as in the following formula.

$$h'(\theta_j,\phi)=h(\theta_j+\phi)+\Delta C_j \quad (20)$$

Thereafter, $\Delta C_j$ is calculated for each angle $\theta_j$, and when formulas (18) and (19) are substituted for formula (20), the following formula is obtained.

$$h'(\theta_j,\phi)=E(\theta_j+\phi)+C_{j-1} \quad (21)$$

Hereon, the following formula is obtained for the arbitrary θ.

$$h'(\theta,0)=E(\theta)+C_{j-1} \quad (22)$$

Although this h'(θ,0) includes an offset amount $C_{j-1}$, usually, $C_{j-1}$ may be ignored to make h'(θ,0) roughly equal to the error function E(θ). Therefore, when h'(θ,0) adjusted by adding the offset adjustment amount $\Delta C_j$ to $h(\theta_j,\phi)$ determined by formula (16) is determined as the error function, the true angle θ is determined by the following formula.

$$\theta=f(\theta)-h'(\theta,0) \quad (23)$$

Next, procedures of this self-calibration are shown in FIG. 6.

First, when a self-calibration program is started, the process proceeds to step S11 to acquire reading values $f(\theta_j+\phi)$ and $f(\theta_j)$ directly under a large number of points on the CCD linear sensor 3 while varying φ. After carrying out this reading a predetermined number of times, the process proceeds to step S12 to calculate an average of the reading values f(θ$_j$+φ) and f(θ$_j$). Furthermore, the process proceeds to step S13 to calculate a difference g(θ$_j$,φ)=f(θ$_j$+φ)−f(θ$_j$) between the two reading values.

Next, the process proceeds to step S14 to check whether all possible data for each predetermined angle has been acquired, that is, to check whether g(θ$_j$,φ) according to φ$_j$ for each predetermined angle has been acquired. For example, it is checked for θ whether g(θ$_j$,φ) has been acquired at intervals of 5° traversing 360°. If all possible data has not been acquired, the process proceeds to step S15, the rotary disk 1 is manually rotated by a predetermined angle (automation by a stepping motor or the like is also possible), and the process returns to step S1. Thereafter, steps S1 to S5 are repeated to determine and store g(θ$_j$,φ) for each predetermined angle θ$_j$.

When it is judged in step S14 that all possible data acquisition has been completed, the process proceeds to step S16 to calculate an average g$_m$(φ) of g(θ$_j$,φ) (see formula (15)). Next, the process proceeds to step S17 to calculate h(θ$_j$,φ)=g(θ$_j$,φ)−g$_m$(φ) (see formula (16)). Next, the process proceeds to S18 to calculate the offset adjustment amount ΔC$_j$ between h(θ$_{j-1}$,φ') and h(θ$_j$,φ) (see formula (19)). Next, the process proceeds to step S19 to add the offset adjustment amount ΔC$_j$ to h(θ$_j$,0) and determine and store the error function h'(θ,0).

This allows accurately determining the true angle θ based on the reading value f(θ) by use of formula (23) in the subsequent measurement. In the case of the present embodiment, since the error function h'(θ$_j$,0) can be determined by a small calculation amount, the time required for self-calibration can be reduced.

However, it is possible to variously modify the aforementioned embodiments. For example, it is not always necessary to determine the reading values f(θ) and f(θ+φ) directly under the foot A of a vertical line drawn from the center O of the rotary disk 1 to the CCD linear sensor 3 and the point B on the CCD linear sensor 3, and reading values at a plurality of positions arbitrarily determined on the CCD linear sensor 3 may be determined. In addition, it may be possible to select a third point on the CCD linear sensor 3 in FIG. 2, prepare formula (2') by providing φ=φ$_3$ in the aforementioned formula (2), and determine reading values according to the aforementioned formulas (1) and (2) and the aforementioned formulas (1) and (2'), respectively, and to separately determine error functions E(θ) based on these and take an average. Furthermore, it may be possible to prepare formula (2") by providing φ=φ$_n$ (n=1, 2, 3, . . . ) in the aforementioned formula (2), determine reading values according to the aforementioned formulas (1) and (2"), respectively, determine an error function E(θ) based on these, and take an average.

DESCRIPTION OF SYMBOLS

Figure 1:
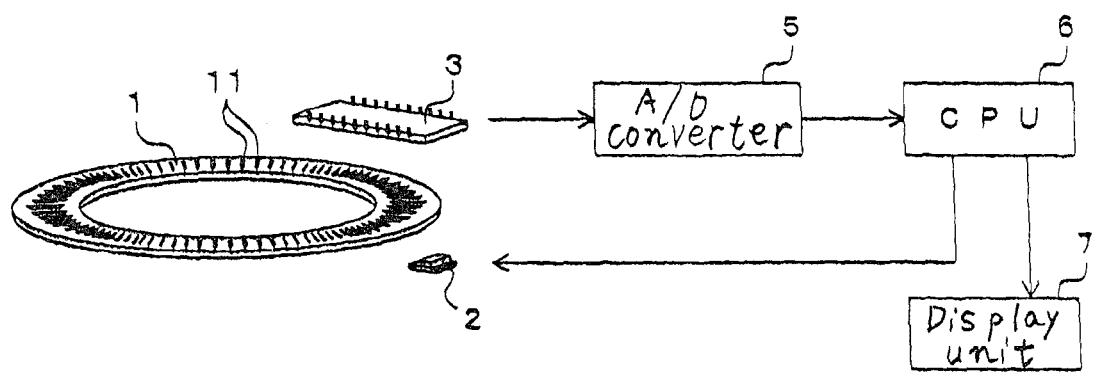
FIG. 1 is a block diagram of rotary encoders of the present invention and conventional art.
Figure 2:
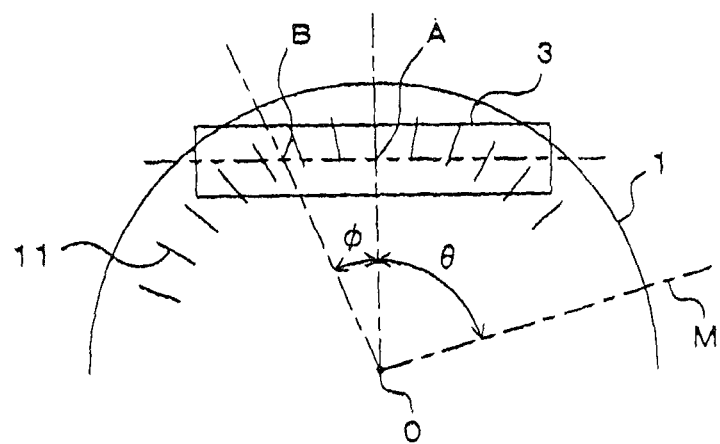
FIG. 2 is a plan view showing a positional relationship between a rotary disk and a CCD linear sensor in the rotary encoder of the present invention.
Figure 3:
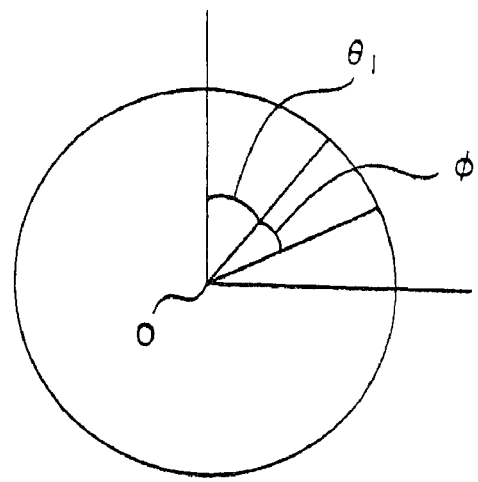
FIGS. 3(A) and (B) are views for explaining a self-calibrating method in a rotary encoder of a first embodiment of the present invention.
Figure 3:
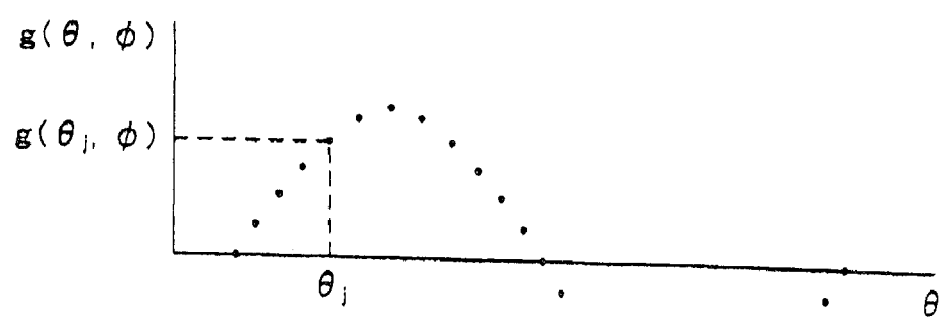
Figure 4:
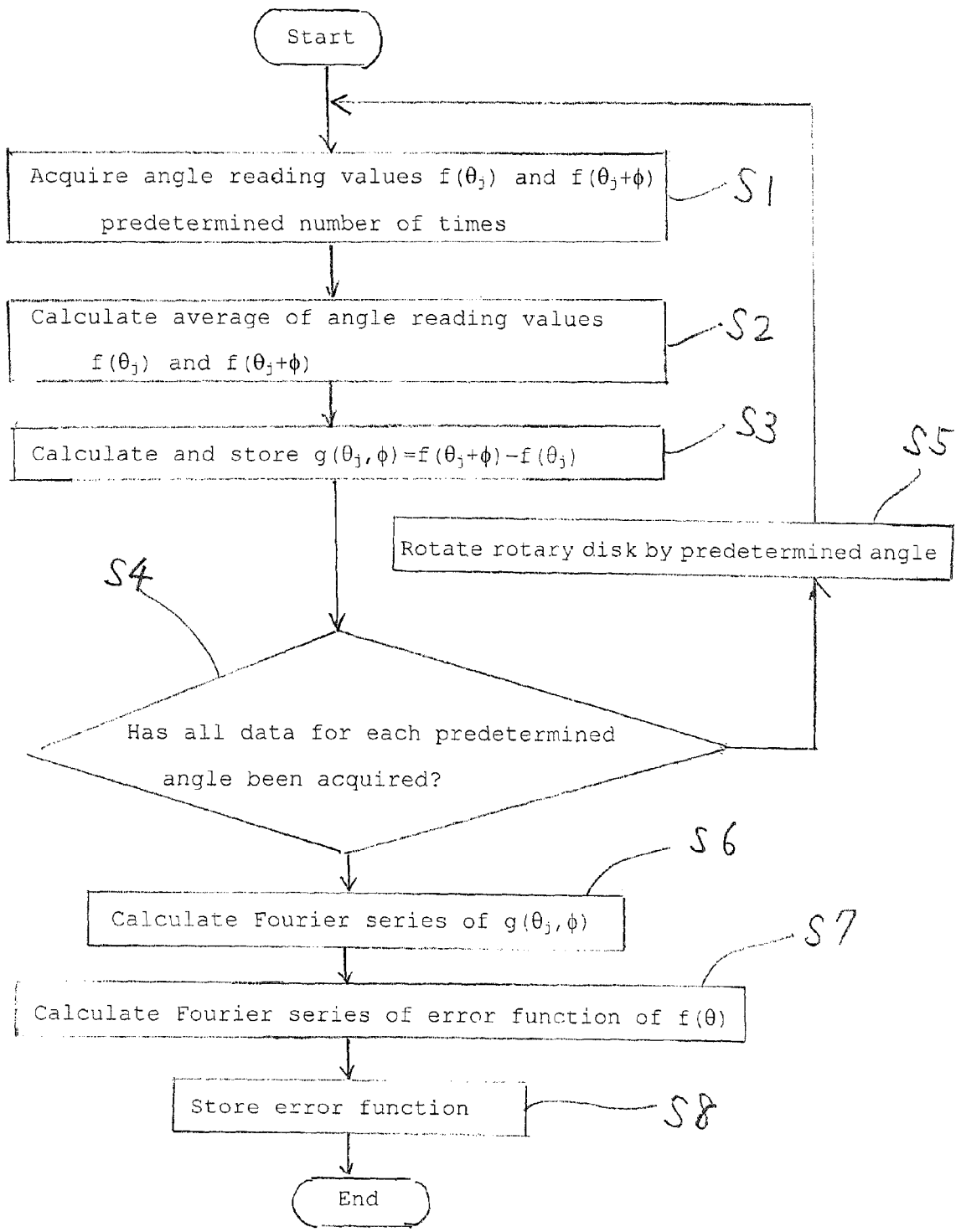
FIG. 4 is a flowchart showing self-calibration procedures in the aforementioned rotary encoder.
Figure 5:
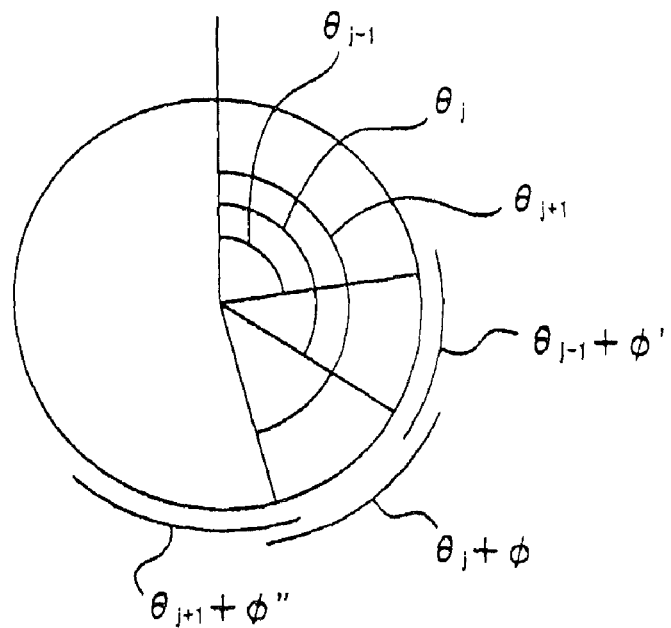
FIGS. 5(A) and (B) are views for explaining a self-calibrating method in a rotary encoder of a second embodiment of the present invention.
Figure 5:
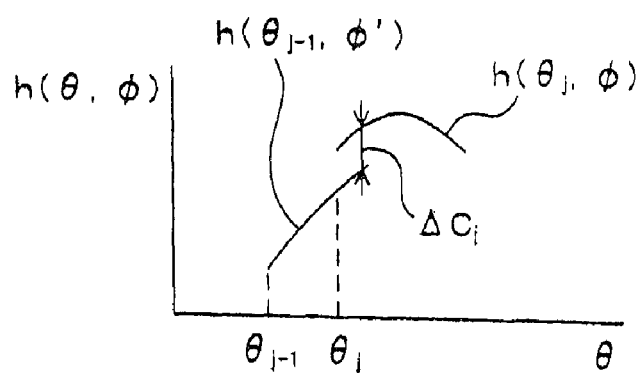
Figure 6:
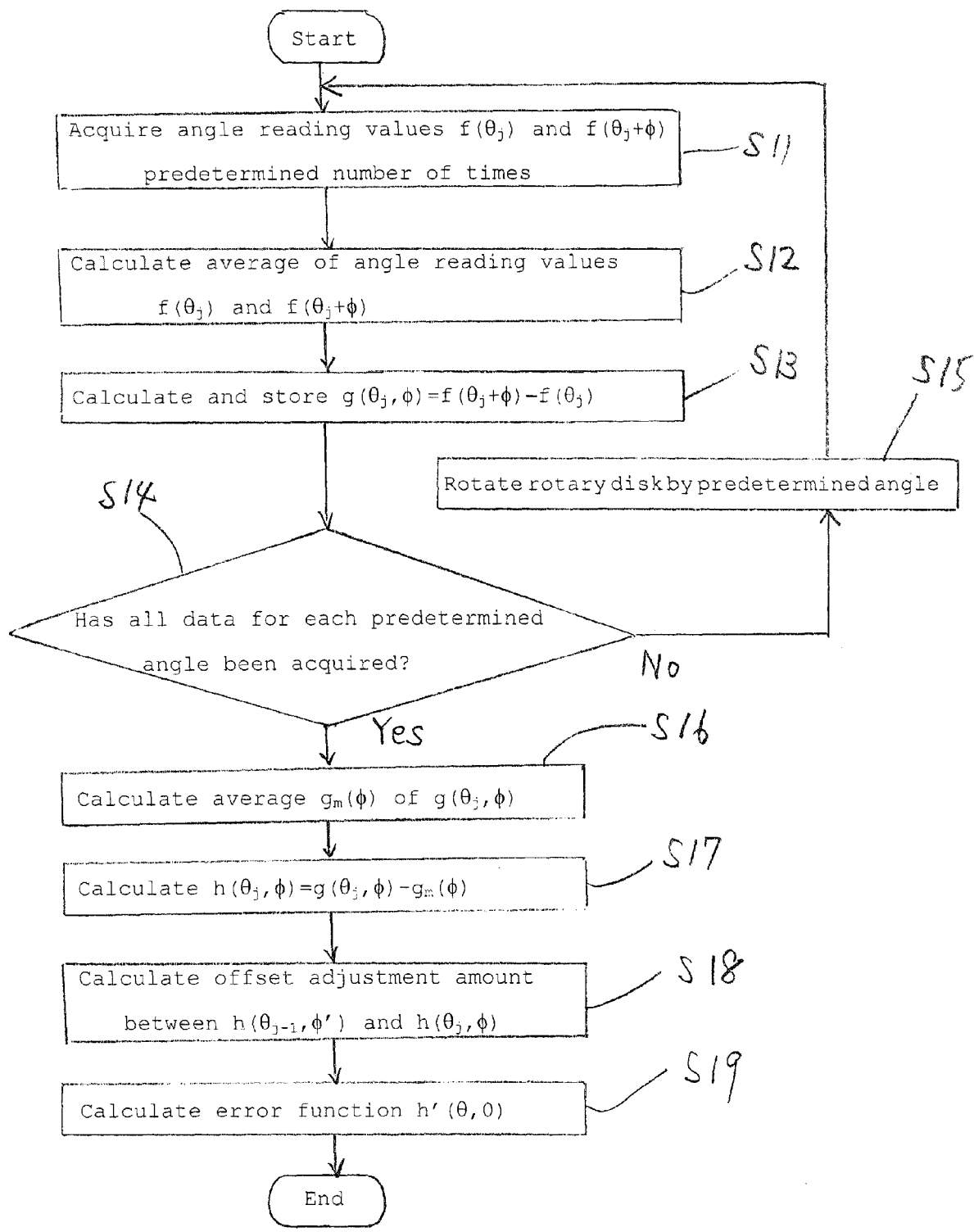
FIG. 6 is a flowchart showing self-calibration procedures in the aforementioned rotary encoder according to the second embodiment.

1 Rotary disk
2 Light source
3 CCD linear sensor (detector)
6 CPU (processing unit)
11 Angle code
θ, φ Angle
f(θ), f(θ+φ) Reading value
g(θ,φ)=f(θ+φ)−f(θ)
g$_m$(φ)=average of g(θ,φ)
h(θ,φ)=g(θ,φ)−g$_m$(φ)

The invention claimed is:

1. A rotary encoder comprising: a rotary disk with an angle code; a light source that irradiates the angle code; a detector that reads the angle code; and a processing unit that acquires a reading value f(θ) based on the angle code read by the detector, wherein
every time the rotary disk is rotated by a predetermined angle, where a rotation angle of the rotary disk is provided as θ and an arbitrary angle from the rotation angle θ within a reading range on the detector is provided as φ, the processing unit acquires reading values f(θ+φ) and f(θ) within the reading range on the detector, and self-calibrates the reading value f(θ) based on a change in a difference g(θ,φ) between the reading values f(θ+φ) and f(θ) when the rotary disk is rotated one turn.

2. The rotary encoder according to claim 1, wherein the rotational position of the rotary disk where the reading values f(θ+φ) and f(θ) are acquired is provided as a position where 360° is roughly equally divided and a position where the reading range on the detector is overlapped at an adjacent rotational position thereto, an average g$_m$(φ) of the differences g(θ,φ) between the reading values f(θ+φ) and f(θ) traversing one turn and deviations h(θ,φ) between the differences g(θ,φ) and the average g$_m$(φ) at respective rotational positions are taken, and by arranging while overlapping the deviations h(θ,φ) in parts where the reading ranges are overlapped between adjacent rotation angle positions, self-calibration of the reading value f(θ) of 0 to 360° is carried out.

3. The rotary encoder according to claim 1, wherein the rotational position of the rotary disk where the reading values f(θ+φ) and f(θ) are acquired is provided as a position where 360° is roughly equally divided, based on a change in the difference g(θ,φ) between the reading values f(θ+φ) and f(θ), the difference g(θ,φ) is determined as a Fourier series, and self-calibration of the reading value f(θ) of 0 to 360° is carried out based on the result.

4. The rotary encoder according to claim 3, wherein in the Fourier series, one or more arbitrary higher harmonics are determined.

5. The rotary encoder according to claim 1, wherein for the arbitrary angle φ, one or more arbitrary positions are used.

6. The rotary encoder according to claim 1, wherein the reading values f(θ+φ) and f(θ) are acquired by averaging a large number of times of reading values.

* * * * *